Figure 1:
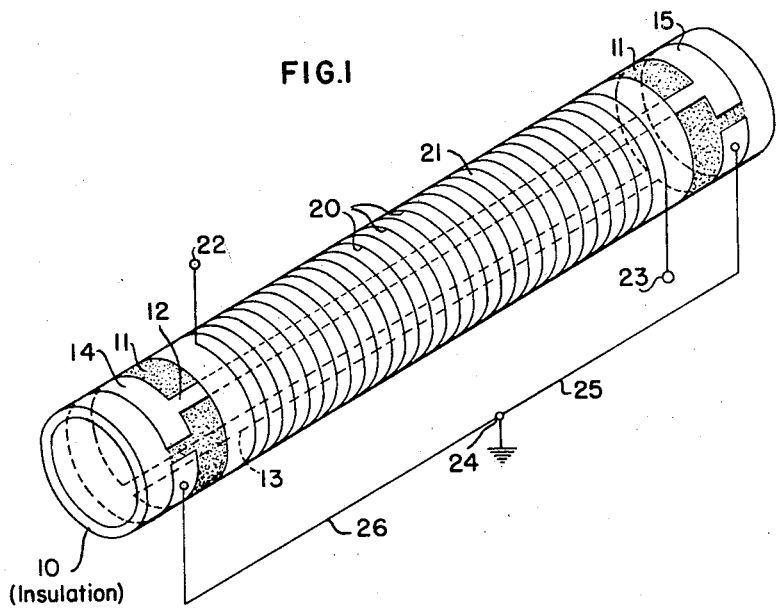

Dec. 31, 1946.  M. J. DI TORO  2,413,608

TIME DELAY NETWORK

Filed March 12, 1945

*INVENTOR.*
MICHAEL J. Di TORO
BY *Harry C. Page*

ATTORNEY

Patented Dec. 31, 1946

2,413,608

UNITED STATES PATENT OFFICE 2,413,608

TIME-DELAY NETWORK

Michael J. Di Toro, Brooklyn, N. Y., assignor, by mesne assignments, to Hazeltine Research, Inc., Chicago, Ill., a corporation of Illinois Application March 12, 1945, Serial No. 582,284

7 Claims. (Cl. 178—44)

This invention is directed to time-delay networks of the unbalanced or three-terminal type for translating signal components included within a predetermined range of frequencies. It is related to the delay networks disclosed in copending applications Serial No. 582,285, filed March 12, 1945, in the name of Harold A. Wheeler, and Serial No. 582,283, filed March 12, 1945, in the name of Michael J. Di Toro and assigned to the same assignee as the present invention.

Time-delay networks, as such, have long been known in the art and are in the form of a balanced or unbalanced circuit. A balanced delay network of the prior art comprises a pair of similar distributed windings coaxially wound about a common supporting core structure but with opposed pitches to contribute to the network uniformly distributed inductance and capacitance. The physical characteristics of the windings, such as dimensions, number of turns per unit length, and conductor size determine the total time delay of the network. The losses and imperfections of the windings determine the attenuation and the pass-band characteristics of the network. While such prior art time-delay networks have proved to be operative, they are subject to certain inherent limitations which may be undesirable in particular installations. For example, the arrangement is susceptible to two distinctly different modes of operation: (1) balanced or normal operation wherein the currents in corresponding portions of its windings are out of phase; and (2) unbalanced or abnormal operation wherein the currents in corresponding portions of its windings are in phase. Additionally, a balanced circuit is generally required for transferring signal energy to or from the network.

An unbalanced delay network of the prior art comprises a single distributed winding and an associated ground-return path. The ground-return path is usually provided by a slotted metal tube which also serves as a supporting core structure for the winding. The capacitance between the winding and its core structure supplies the distributed capacitance of the network which, together with the inductance of the winding, determines the total time delay. A particular time delay may be obtained by appropriately selecting the physical characteristics of the winding and its core structure. Such an arrangement is subject to but a single mode of operation, and an unbalanced circuit may be utilized for transferring energy with reference thereto. To this extent, the unbalanced delay network is more desirable than the described balanced arrangement. However, such unbalanced networks of the prior art have been subject to serious loss problems. For example, the eddy-current loss in the core structure has been severe, since the core is closely positioned with reference to a large portion of the surface of the winding in order to furnish the desired distributed capacitance in the network. Additionally, it is found that the core structure undesirably shields the magnetic field of the winding and reduces the inductance of the network.

It is an object of the invention, therefore, to provide an improved time-delay network for translating signal components included within a predetermined range of frequencies and which avoids one or more of the above-mentioned limitations of prior-art arrangements.

It is another object of the invention to provide an improved time-delay network of the unbalanced or three-terminal type for translating, with minimum attenuation, signal components included within a predetermined range of frequencies.

It is a further object of the invention to provide an improved time-delay network of the unbalanced type for translating signal components included within a predetermined range of frequencies and having minimum attenuation for all signals within this range.

In accordance with the invention, a time-delay network for translating signal components included within a predetermined range of frequencies comprises an elongated structure having a predetermined conductivity and having a peripheral coating of material having a substantially greater conductivity. The network includes an elongated winding insulated from but electrically coupled along its length to the elongated structure to provide in the network a distributed capacitance. This capacitance comprises the capacitance between the winding and the elongated structure and determines, in conjunction with the inductance of the winding, the time delay of the network. Additionally, the network has a longitudinal conductor conductively connected along its length to the conductive coating of the elongated structure. The conductor is selected to have a substantially lower impedance per unit length than that of the coating, and such cross-sectional configuration as to be linked by only a small fractional portion of the magnetic flux of the winding.

For a better understanding of the present invention, together with other and further objects thereof, reference is had to the following description taken in connection with the accompanying drawing, and its scope will be pointed out in the appended claims.

Figure 2:
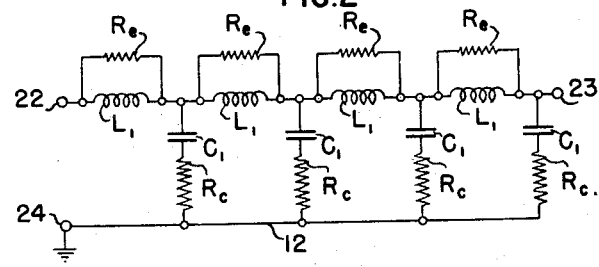

In the drawing, Fig. 1 is a schematic representation of an unbalanced time-delay network in accordance with the present invention; and Fig. 2 is a schematic circuit diagram utilized in discussing the attenuation properties of the network.

Referring now more particularly to Fig. 1, the time-delay network there represented is of the unbalanced or three-terminal type for translating signal components included within a predetermined range of frequencies. This network is in the form of a simulated transmission line and comprises an elongated supporting core structure 10 having a predetermined conductivity. Preferably, the core structure has a low conductivity. As illustrated, it is of insulating material and is provided by a tube of thermoplastic resin, or glass. However, any similar insulating material may be used, being formed into a supporting core structure of any desired cross-sectional configuration. The core 10 has a thin peripheral coating 11 over a major portion of its outer circumference. The conductive coating 11 may be a metallized film bonded to insulating member 10 and preferably includes a conductive material having a substantially greater conductivity than core 10, suitable materials being platinum, silver, gold, or graphite deflocculated in water. At least one longitudinal or axially extending nonmagnetic conductor is included in the core structure, extending along the coated portion thereof and arranged to be conductively connected along its length to the coating 11. Two such conductors are illustrated in the drawing and are indicated at 12 and 13. The conductors are preferably diametrically spaced on core structure 10 and are embedded in the coating 11 so as to be conductively connected therewith. Each conductor 12 and 13 is selected to have a substantially lower impedance per unit length than that of coating 11, and such a small cross-sectional configuration compared with that of core structure 10 as to be linked by only a small fractional portion of the magnetic flux of a winding, to be described presently, included in the network. Copper straps or lengths of conventional copper wire may be utilized for conductors 12 and 13. A pair of split conductive rings 14 and 15 are coaxially supported by core structure 10 and are conductively connected with straps 12 and 13. Generally, the split collars are formed of the same material as the longitudinal straps to have substantially the same impedance characteristic.

The described composite core structure may be assembled in any of several ways. It is evident, for example, that longitudinal straps 12 and 13, as well as split rings 14 and 15, may be assembled upon structure 10. Coating 11 may be thereafter uniformly applied to the exposed portions of the core structure within the boundary limited by rings 14 and 15. Alternatively, the core may be uniformly coated and the conductive structures 12, 13, 14 and 15 thereafter assembled over the coated core.

The network also includes an elongated or distributed winding 20 wound around the coated portion of the core structure mechanically to be supported thereby. The winding is insulated from the conductive coating of its supporting core structure by an insulating sleeve or tape 21, although this insulation may be omitted where the insulation of winding 20 has sufficiently high dielectric properties. Due to the inherent capacitance between winding 20 and the conductive coating 11 of the core structure, the winding is electrically coupled along its length to the core structure to provide in the delay network a distributed capacitance, namely, the capacitance between the core structure and the winding. This capacitance, in conjunction with the inductance of winding 20, determines the time delay of the network since, in any such circuit arrangement, the total time delay is proportional to the geometric mean of its total inductance and total capacitance. The diameter and length of core structure 10, the size and type of conductor utilized in fabricating winding 20, and the number and pitch of the winding convolutions are selected to afford such desired values of inductance and capacitance that the network produces a certain total time delay. In this connection, it will be appreciated that an increase in the diameter or length of the core structure and winding results in higher values of inductance and capacitance, while increasing the number of turns per unit length of the winding increases primarily only the inductance. The inductance alone may also be increased by appropriately increasing the permeability of core structure 10. For example, magnetic material may be molded into the structure.

An input terminal 22 for applying signals to the network is provided at one end of winding 20, and an output terminal 23, for deriving delayed signals therefrom, is provided at the opposite end of the winding. The low-impedance conductive structure of elements 12–15, inclusive, of the core assembly is coupled by way of suitable low-impedance conductors 25 and 26 to a common terminal 24 of the network, which is usually a ground connection.

The described arrangement will be seen to constitute an unbalanced or three-terminal network. It is said to be a three-terminal network since it comprises an input terminal 22 and an output terminal 23 and a third or common terminal 24. In the schematic circuit diagram of Fig. 2, which is approximately the electrical equivalent of the Fig. 1 arrangement, the distributed inductance of winding 20 is shown as series-connected inductors $L_1$, $L_1$ and the distributed capacitance between the winding and its core structure is designated by shunt-connected condensers $C_1$, $C_1$. This circuit arrangement, including series-connected inductors and shunt-connected condensers, essentially comprises a transmission line having a given total time delay. As will be made clear presently, the network is constructed through appropriate proportioning of the conductive material of its core structure to have a minimum attenuation over a given pass band for translating signal components included within a predetermined range of frequencies. By virtue of this feature, signal components included within a desired frequency range and applied to input terminal 22 are translated with minimum attenuation and distortion to output terminal 23.

In discussing the attenuation characteristics of the network of Figs. 1 and 2, the resistance of winding 12 will be neglected. It will further be assumed that a single grounding conductive strap, say conductor 12, is provided in the core structure and that the impedance per unit length of this strap is also negligible. Thus, in the representation of Fig. 2, conductor 12 may be construed as a ground plane associated with the network. For the assumed conditions, the attenuation to be minimized is determined largely by the eddy-current losses and the conduction-current losses of the network. The term "conduction-current losses," as here used, designates the losses resulting from current flow within the network as distinguished from losses attributable to induced currents, induced by actual current flow within the network. The eddy-current losses which do result from induced currents are associated with the inductance of winding 20. These losses may be considered as occurring in the resistors $R_e$, $R_e$ shown in shunt relation with the series-connected inductors $L_1$, $L_1$ of Fig. 2. The conduction-current losses, on the other hand, are associated with the currents flowing through the inductors $L_1$, $L_1$ and the shunt paths to ground, and may be considered to occur in the resistors $R_c$, $R_c$. Since the magnitudes of both the eddy currents and the conduction currents are determined, at least in part, by the conductivity of the coating 11 of core member 10, this coating is effective to determine the attenuation characteristic of the network and has a critical value for minimum attenuation which may be determined with the aid of the following expressions, in which:

$n$ = number of turns in winding 20
$a$ = radius of winding 20 (meters)
$b$ = length of winding 20 (meters)
$\mu$ = permeability of core structure 10, 11 (henries per meter)
$L_1$ = inductance per unit length of winding 20 (henries per meter)
$C_1$ = distributed capacitance per unit length of network (farads per meter)
$R_k$ = characteristic impedance of delay network (ohms)
$R_1$ = surface resistivity of coating 11 (ohms per square)
$R_c$ = conduction-current loss resistance per unit length of network (ohms per meter)
$R''$ = equivalent series resistance per unit length of network of eddy-current shunt-loss resistance (ohms per meter)
$R_s$ = effective series resistance per unit length of network of conduction-current and eddy-current loss resistances (ohms per meter)
$\omega = 2\pi$ times the operating frequency
$g$ = number of low-impedance grounding conductors
$t_d$ = one-way delay of network (seconds)
$t_{d_1}$ = one-way delay of network per unit length (seconds)
$\theta_1$ = phase shift of network per turn of winding 20
(') indicates the preferred value of the factor to which it is affixed For the case where a single grounding strap is included in the core structure:

$$R_s = R_c + R'' \quad (1)$$

$$L_1 = \frac{\mu n^2 \pi a^2}{b^2} \quad (2)$$

$$R_c = \frac{R_1 \omega^2 C_1^2 R_k^2 \pi a}{6} \quad (3)$$

$$R'' = \frac{\pi \omega^2 \mu^2 a^3 n^2}{2R_1 b^2} \quad (4)$$

$$R_s = \frac{R_1 \omega^2 C_1^2 R_k^2 \pi a}{6} + \frac{\pi \omega^2 \mu^2 a^3 n^2}{2R_1 b^2} \quad (5)$$

$$Q = \frac{\omega L_1}{R_s} \quad (6)$$

From Equation 5 it is noted that in this network the attenuation per unit length caused by the conduction-current losses in $R_c$ and the eddy-current losses in $R''$ both vary directly as the square of the frequency. It is also seen that the attenuation factors $R_c$ and $R''$ vary in opposite senses with variations in the surface resistivity $R_1$. It thus becomes apparent that the total attenuation per unit length caused by $R_s$ may be minimized by selecting the value of surface resistivity which causes the factors $R_c$ and $R''$ to be equal. Where this equalization of the conduction-current losses and eddy-current losses occurs:

$$(R_1')^2 = \frac{3\mu^2 a^2 n^2}{b^2 C_1^2 R_k^2} \quad (7)$$

$$R_1' = \frac{\sqrt{3}\mu a n}{b C_1 R_k} \quad (8)$$

$$R_1' = \left(\frac{\sqrt{3}b}{\pi n a}\right) R_k \quad (9)$$

For this selected value of surface resistivity the Q of the network is a maximum and is equal to:

$$Q_{max} = \frac{\omega L_1}{2R_c'} = \frac{\omega L_1}{2} \cdot \frac{6}{R_1' \omega^2 C_1^2 R_k \pi a} \quad (10)$$

$$Q_{max} = \frac{\sqrt{3}n}{\omega b \sqrt{L_1 C_1}} = \frac{\sqrt{3}n}{\omega b t_{d1}} = \frac{\sqrt{3}n}{\omega t_d} = \frac{\sqrt{3}}{\theta_1} \quad (11)$$

Equation 9 is an expression for the surface resistivity of coating 11, resulting in minimum attenuation and maximum Q of the network. The expression includes only terms which are definitely known for a given network and permits the surface resistivity to be computed readily. Having determined the optimum surface resistivity to be provided, the selection of the conductive material of the coating dictates the thickness of coating to be employed. Where the conductive material and thickness of the coating are selected in the manner described, the coating has such conductivity and constitutes such portion of the core structure that the eddy-current losses in the core structure are approximately equal to the conduction-current losses thereof at all frequencies within the pass band of the network.

As described above, conductive straps 12 and 13 have a small cross section as compared with that of core structure 10. For this reason, these straps occupy but a small fractional portion of the magnetic field established by winding 20 and, therefore, are linked by only a small fractional portion of the magnetic flux of the winding.

Equations 9 and 11 have been derived on the premise that a single conductive grounding strap was included in the core structure. In more general terms, these expressions may be written as follows to take into consideration the case where a plurality of conductive grounding straps are used:

$$R_1' = \left(\frac{g\sqrt{3}b}{\pi n a}\right) R_k \quad (12)$$

$$Q_{max} = \frac{g\sqrt{3}n}{\omega b \sqrt{L_1 C_1}} = \frac{g\sqrt{3}n}{\omega b t_{d1}} = \frac{g\sqrt{3}n}{\omega t_d} = \frac{g\sqrt{3}}{\theta_1} \quad (13)$$

By increasing the number of grounding conductors up to a certain limit, the attenuation of the network is further reduced and its Q is increased. While each conductive grounding strap has a small cross-sectional configuration, where a large number of such straps are included around the periphery of the core structure they exhibit appreciable eddy-current losses. The foregoing derivations are valid for network constructions in which the losses of the grounding straps are negligibly small. The advantages of the invention may, however, be realized so long as the number of conductive straps is so limited that the total attenuation of the network is minimized or reduced beyond the attenuation in the absence of such conductive straps. In the usual case, one or two grounding straps provide the most satisfactory structural and electrical arrangement.

While both experience and theory show that best results are obtained when the eddy-current and conduction-current losses are equal, the advantages of the invention may nevertheless be obtained to a substantial degree if these losses are approximately equal. The term "approximately equal," as used in the description and appended claims, is intended to mean that one of the losses may be between 1.0 and 0.1 times the other. Where the attenuation factors are proportioned within the limits of this definition, the ratio of the actual Q of the network to the maximum Q, obtained when the eddy-current and conduction-current losses are equal, is greater than 0.57.

Terminals 22, 23 and 24 permit the time-delay network to be coupled, as desired, in a signal-translating system. The network is subject to a wide variety of applications and may be utilized, for example, to obtain a desired time delay of applied transient signals. Also, through appropriate termination of the output circuit of the network, echoes or reflections of an applied signal may be obtained as with well-known reflecting transmission-line arrangements. Additionally, the network is useful in pulse-generating systems wherein similar delay networks determine the duration and spacing of the generated pulses.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A time-delay network for translating signal components included within a predetermined range of frequencies comprising, an elongated structure having a predetermined coductivity and having a peripheral coating of conductive material of substantially greater conductivity, an elongated winding insulated from but electrically coupled along its length to said structure to provide in said network a distributed capacitance comprising the capacitance between said winding and said structure for determining in conjunction with the inductance of said winding the time delay of said network, and a longitudinal conductor conductively connected along its length to said coating and having a substantially lower impedance per unit length than said coating and such cross-sectional configuration as to be linked by only a small fractional portion of the magnetic flux of said winding.

2. A time-delay network for translating signal components included within a predetermined range of frequencies comprising, an elongated structure of insulating material having a peripheral coating of conductive material, an elongated winding insulated from but electrically coupled along its length to said structure to provide in said network a distributed capacitance comprising the capacitance between said winding and said structure for determining in conjunction with the inductance of said winding the time delay of said network, and a longitudinal conductor conductively connected along its length to said coating and having a substantially lower impedance per unit length than said coating and such cross-sectional configuration as to be linked by only a small fractional portion of the magnetic flux of said winding.

3. A time-delay network for translating signal components included within a predetermined range of frequencies comprising, an elongated structure having a predetermined conductivity and having a peripheral coating of conductive material of substantially greater conductivity, an elongated winding insulated from but electrically coupled along its length to said structure to provide in said network a distributed capacitance comprising the capacitance between said winding and said structure for determining in conjunction with the inductance of said winding the time delay of said network, and a longitudinal conductor embedded in said coating so as to be conductively connected thereto along its length and having a substantially lower impedance per unit length than said coating and such cross-sectional configuration as to be linked by only a small fractional portion of the magnetic flux of said winding.

4. A time-delay network for translating signal components included within a predetermined range of frequencies comprising, an elongated core structure having a predetermined conductivity and having a peripheral coating of conductive material of substantially greater conductivity, an elongated winding insulated from but electrically coupled along its length to said core structure to provide in said network a distributed capacitance comprising the capacitance between said winding and said core structure for determining in conjunction with the inductance of said winding the time delay of said network, and a longitudinal conductor conductively connected along its length to said coating and having a substantially lower impedance per unit length than said coating and such cross-sectional configuration as to be linked by only a small fractional portion of the magnetic flux of said winding.

5. A time-delay network for translating signal components included within a predetermined range of frequencies comprising, an elongated structure having a predetermined conductivity and having a peripheral coating of conductive material of substantially greater conductivity, an elongated winding insulated from but electrically coupled along its length to said structure to provide in said network a distributed capacitance comprising the capacitance between said winding and said structure for determining in conjunction with the inductance of said winding the time delay of said network, and a longitudinal conductor conductively connected along its length to said coating and having a substantially lower impedance per unit length than said coating and such cross-sectional configuration as to be linked by only a small fractional portion of the magnetic flux of said winding, said conductive coating having such conductivity and constituting such portion of said structure that the eddy-current losses in said structure have a predetermined relation to the conduction-current losses thereof at all frequencies within said range.

6. A time-delay network for translating signal components included within a predetermined range of frequencies comprising, an elongated structure having a predetermined conductivity and having a peripheral coating of conductive material of substantially greater conductivity, an elongated winding insulated from but electrically coupled along its length to said structure to provide in said network a distributed capacitance comprising the capacitance between said winding and said structure for determining in conjunction with the inductance of said winding the time delay of said network, and a longitudinal conductor conductively connected along its length to said coating and having a substantially lower impedance per unit length than said coating and such cross-sectional configuration as to be linked by only a small fractional portion of the magnetic flux of said winding, said conductive coating having such conductivity and constituting such portion of said structure that the eddy-current losses in said structure are approximately equal to the conduction-current losses thereof at all frequencies within said range.

7. A time-delay network for translating signal components included within a predetermined range of frequencies comprising, an elongated structure having a predetermined conductivity and having a peripheral coating of conductive material of substantially greater conductivity, an elongated winding insulated from but electrically coupled along its length to said structure to provide in said network a distributed capacitance comprising the capacitance between said winding and said structure for determining in conjunction with the inductance of said winding the time delay of said network, a pair of longitudinal conductors each of which is connected along its length to said coating and having a substantially lower impedance per unit length than said coating and such cross-sectional configuration as to be linked by only a small fractional portion of the magnetic flux of said winding, and a split conductive ring supported in coaxial alignment with said structure for conductively connecting said longitudinal conductors and having an impedance per unit length approximately equal to that of said conductors.

MICHAEL J. DI TORO.